V. F. FEHRM.
SAW MOUNTING.
APPLICATION FILED JULY 30, 1919.
1,380,707.
Patented June 7, 1921.
3 SHEETS—SHEET 1.
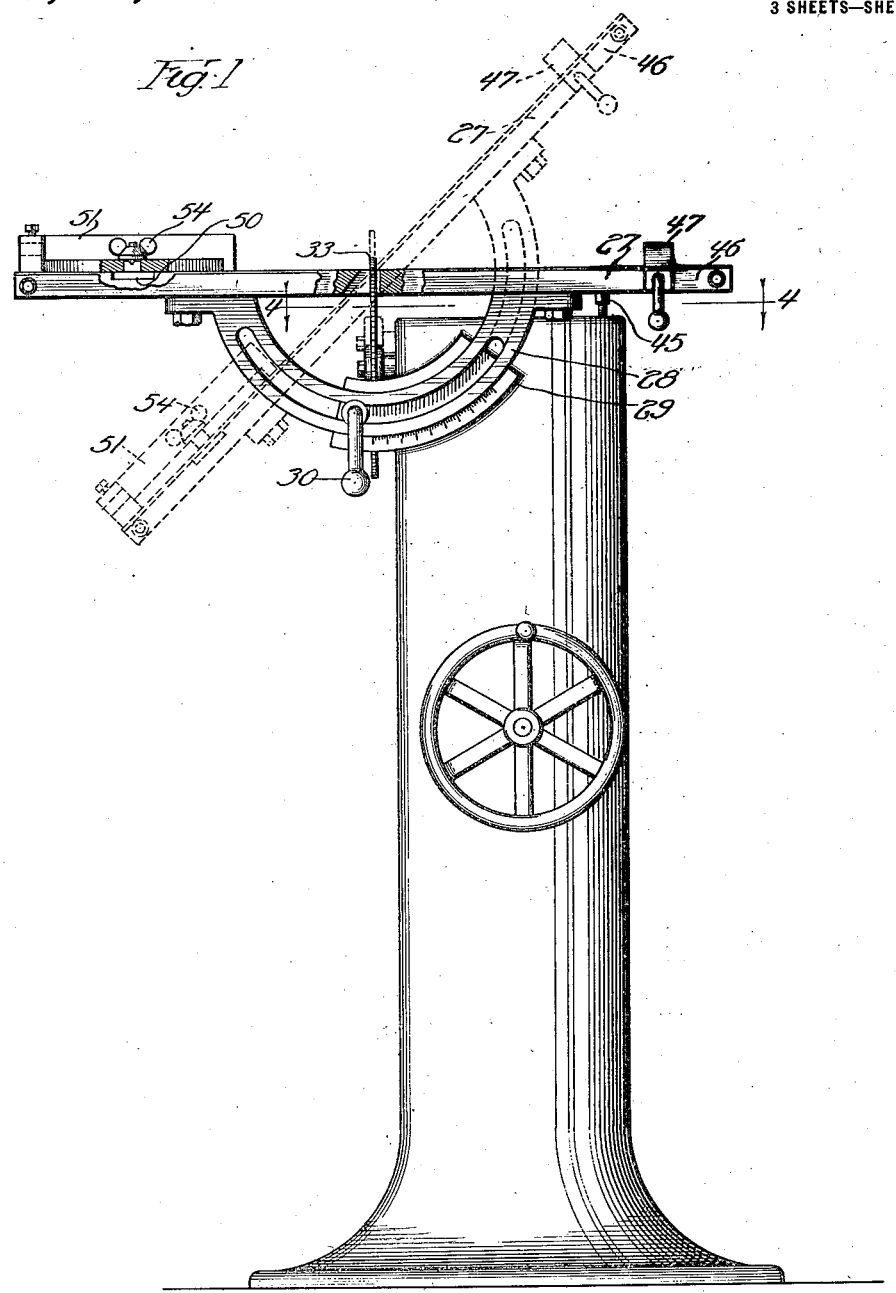
Inventor
Victor F. Fehrm

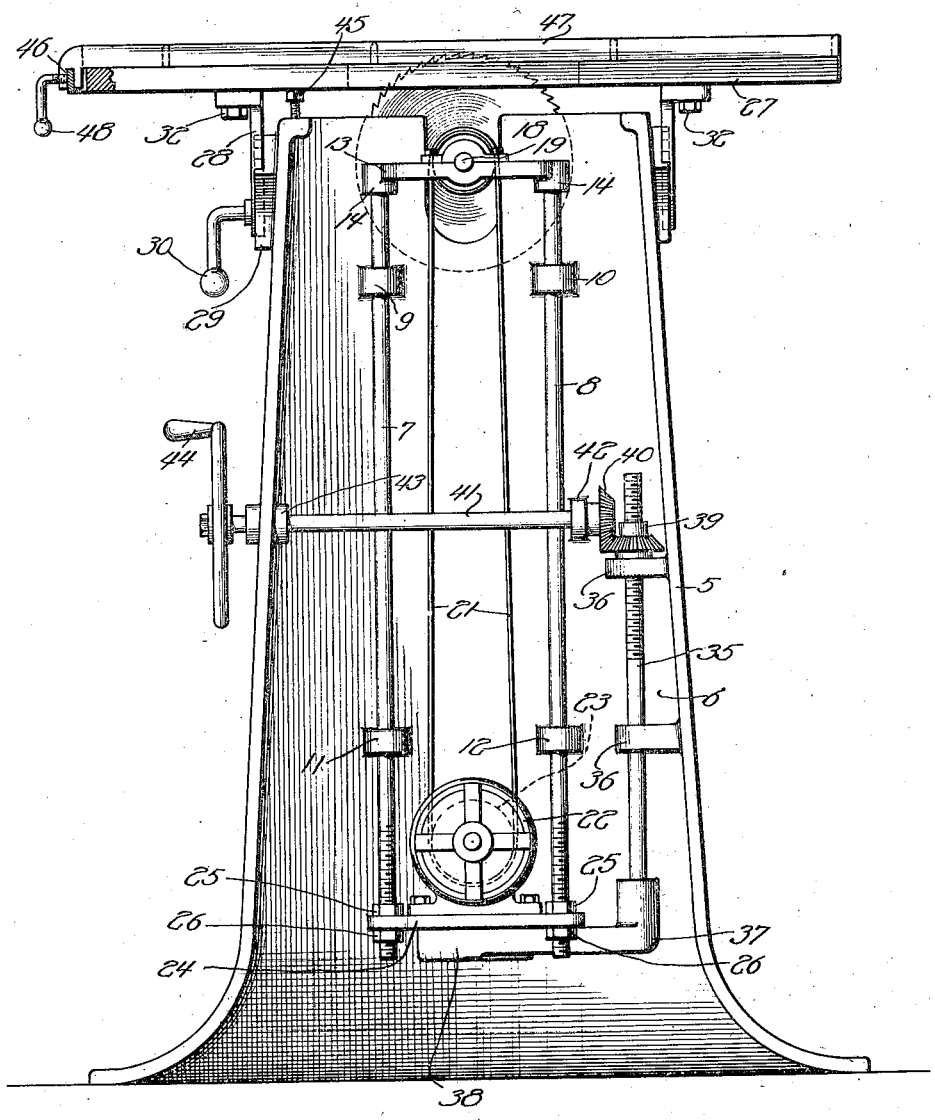

V. F. FEHRM.
SAW MOUNTING.
APPLICATION FILED JULY 30, 1919.
1,380,707.
Patented June 7, 1921.
3 SHEETS—SHEET 3.
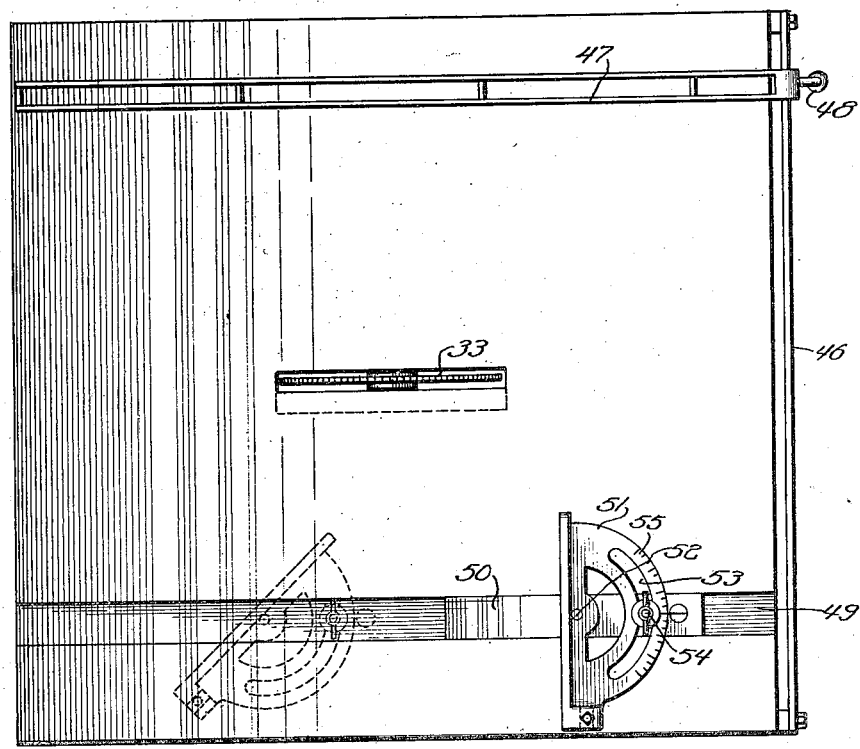
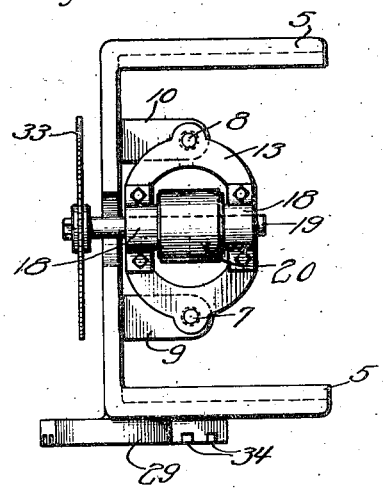
Inventor
Victor F. Fehrm

UNITED STATES PATENT OFFICE.

VICTOR F. FEHRM, OF CHICAGO, ILLINOIS.

SAW-MOUNTING.

1,380,707.   Specification of Letters Patent.   Patented June 7, 1921.

Application filed July 30, 1919. Serial No. 314,305.

*To all whom it may concern:*

Be it known that I, VICTOR F. FEHRM, a citizen of the United States, residing at Chicago, in the county of Cook and State of Illinois, have invented certain new and useful Improvements in Saw-Mountings, of which the following is a specification.

My invention relates to improvements in saw mountings, or circular sawing machines.

One of the objects of the invention is to provide an incomplex means for mounting a mandrel, for one or more saws, on a frame or casing, whereby the saw or saws may quickly be raised and lowered for more convenient manipulation and in which the table may be inclined with reference to the saw; wherein the source of power in the particular embodiment shown, an electric motor, is moved with the saw mandrel without disturbing its driving relation therewith and in which the driving belt may quickly be tightened to definite tension and the parts secured in adjusted position.

Another object is to provide a saw mounting wherein the mechanism for operating and adjusting the height of the saw is inclosed.

Other, further and more particular objects of my invention will become readily apparent, to persons skilled in the art, from a consideration of the following description when taken in conjunction with the drawings, wherein:—

Figure 1 is an end elevation of the apparatus with parts shown in section.

Fig. 2 is an elevation, at right angles to the structure exemplified in Fig. 1, with parts in section and showing the interior of the housing frame.

Fig. 3 is a top plan view of the saw table.

Fig. 4 is a top plan view, with the table removed.

In all of the views the same reference characters are employed to indicate similar parts.

In the exemplification depicted by the drawings, 5 is a frame, preferably in the shape of a housing, having one side open, as at 6, that may conveniently be closed with any suitable door or other closure. Two parallel side rods 7 and 8 are freely slidable in a vertical direction in bearings 9, 10, 11 and 12. The upper ends of the rods 7 and 8, are connected together by a frame 13, having bearings 14 at each end. The frame extends transversely of the side rods and has a bearing box 18, on each end, for a saw mandrel 19. Substantially midway of the members of the frame 13 is a driven pulley 20, secured to the mandrel 19, for a belt 21, driven by an electric motor 22, located in the interior of the housing.

The electric motor is supplied with a driving pulley 23 for driving the saw by the belt 21.

Adjustably secured to the lower threaded ends of the side rods 7 and 8 is a base plate 24 by adjusting nuts 25 and 26 upon which to support the motor 22.

A saw table 27 is supported on two slotted segments 28, one on each side, by two integral grooved blocks 29, adjustably secured to the blocks by set screw 30, so that the table may be inclined to a greater or less extent and secured in adjusted position. The slotted segments 28 are secured to the under side of the table by the screws or bolts 32 and move in the curved groove 34 in the blocks 29.

A saw 33 is mounted on one end of the mandrel 19 and the table may be made to tilt toward the saw to any desirable extent and secured in adjusted position by the hand screw bolt 30.

For the purpose of bodily raising and lowering the saw, mounted upon the upper ends of the rods 7 and 8, I provide a screw threaded shaft 35 having bearings in the inwardly projecting lugs 36. To the lower end of the shaft 35 is secured an arm 37 having a part 38 resting separably in contact with the under surface of the base 24, upon which the motor is mounted. A miter gear wheel 39 is provided with a screw threaded bore for raising and lowering the shaft 35 and the bracket 37. To facilitate such an operation, another miter gear wheel 40 is in mesh with the gear wheel 39 and is secured to the transversely extending shaft 41 which finds bearing in the lug 42 and in an inwardly projecting lug 43. The shaft 41 is turned by a handle 44.

When it is desired to tighten the belt, between the motor and the mandrel, the nuts 26 are backed away from the base plate 24 and the weight of the motor is permitted to tension the belt, the supporting bracket 38 having been withdrawn from its contact with the under surface of the base plate 24, in order that the motor 22 and the plate 24 may descend, by the effect of the gravity.

When the motor has settled into its position, then it is fixed by the nuts 25, whereupon the part 38 of the bracket 37, is returned to normal position in contact with the under surface of the plate 24 so that by rotating the handle 44 the entire mechanism, supported on the vertical rods 7 and 8, may be bodily raised.

A set screw 45 is adjustable as a stop so that the saw table 27 may invariably be returned to exact horizontal position. Fixed to the side of the table 27 is a spaced-away bar 46 upon which slides a gage-bar 47, serving as a guide for boards that are being ripped by the saw, and which is fixed to the bar 46 in adjusted position by the clamping screw 48.

The table is provided with a dove-tail groove 49 within which slides a relatively flat elongated plate 50 which bears a pivoted gage 51, pivoted thereto, as at 52, and having a curved slot 53 within which is contained a clamping screw 54. A curved part 55, bounding the slot, is graduated to indicate the degree of inclination of the gage 51.

While I have herein shown a single embodiment of my invention, for the purpose of clear disclosure, it will be manifest, to persons skilled in the art, that considerable change may be made in the general arrangement and configuration of the parts within the scope of the appended claim.

Having described my invention, what I claim is:—

In a device of the character described, the combination with a saw table and a saw vertically adjustable to project a greater or less degree above the table; a housing forming a columnar support for the table and having within the same guide brackets; a frame comprising parallel rods longitudinally slidable in said brackets; a cross bar at the upper ends of said rods carrying bearings for the saw shaft, and a cross bar carrying a motor adjustable above lower ends of said rods for adjusting a belt connecting the motor and said saw shaft; an elevating screw within the housing parallel to said rods and connected to the frame, the shaft projecting through the housing and a gear to operate said elevating screw.

In testimony whereof I hereunto subscribe my name.

VICTOR F. FEHRM.